Figure 2:
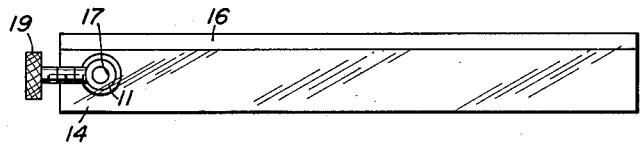

June 25, 1963  E. W. ROLLE  3,094,874
UNDERWATER DEPTH GAUGE
Original Filed May 25, 1955

INVENTOR.
EDWARD. W. ROLLE
BY
ATTORNEYS

United States Patent Office
3,094,874
Patented June 25, 1963

3,094,874
UNDERWATER DEPTH GAUGE
Edward W. Rolle, P.O. Box 6456, Point Loma Station,
San Diego, Calif.
Continuation of application Ser. No. 511,137, May 25,
1955. This application Apr. 15, 1959, Ser. No. 806,733
2 Claims. (Cl. 73—299)
(Granted under Title 35, U.C. Code (1952), sec. 266)

The invention described herein may be manufactured and used by or for the Government of the United States of America for governmental purposes without the payment of any royalties thereon or therefor.

This application is a continuation of application Serial No. 511,137, filed May 25, 1955, now abandoned by the applicant herein. The invention relates to underwater depth gauges and in particular to a gauge having an indicating liquid separated by a resilient diaphragm from the liquid whose pressure is being measured in terms of depth and which can be read in total darkness. This gauge may be used by skin divers, frogmen and other underwater swimmers to indicate their depth from the surface of the water.

Heretofore a narrow tube closed at one end was filled with air and inserted into the water with its open end downward. Water pressure on the open end of the tube forced water into the tube compressing the air therein. The tube was calibrated to read the water penetration in terms of feet below the surface of the water but is subject to temperature correction. However, this old type of depth gauge becomes inaccurate through the activity of the diver as water displaces the air in the tube instead of compressing it. It was necessary to illuminate the gauge from an external source in order to read it.

The depth gauge depicted by this invention uses an opaque liquid against a phosphorescent background. This liquid is housed in a rubber bulb which isolates it from sea water. The bulb compresses in response to water pressure, sending the opaque liquid into the transparent tube to compress the gas therein. This tube is housed in a clear plastic against the phosphorescent background and is calibrated in terms of feet of depth corresponding to the underwater pressure. An adjusting screw presses against the bulb so that the column of liquid can be adjusted to a zero initial reading before it is submerged. The relative volumes of the opaque liquid and gas are in inverse proportion to their thermal coefficients of expansion, such that the calibration is linear.

It is therefore an object of this invention to provide an underwater depth gauge whose indicating liquid is separated from the water by a pressure sensitive diaphragm.

Another object is the provision of a depth gauge whose calibrations are linear and which can be read at night or in total darkness.

Still another object is to provide a depth gauge responsive to pressure and volume factors under the law of gases but uneffected by temperature variations.

Another object is the provision of a depth gauge which can be preset to avoid making comparative computations as a result of temperature changes and to assure greater accuracy.

A further object is the provision of an improved depth gauge made from non-critical materials, simple to construct, inexpensive to manufacture, light and compact in design, and dependable in service.

Figure 1:
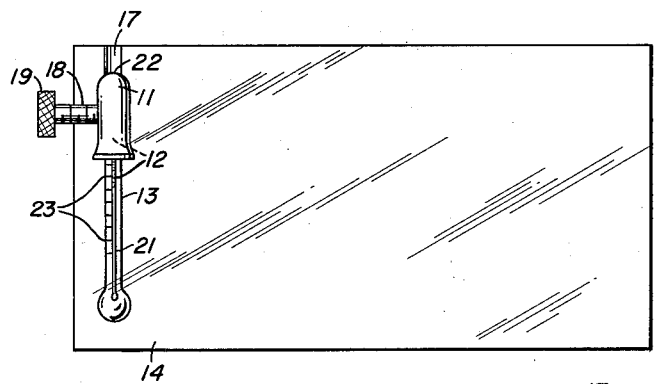
Figure 3:
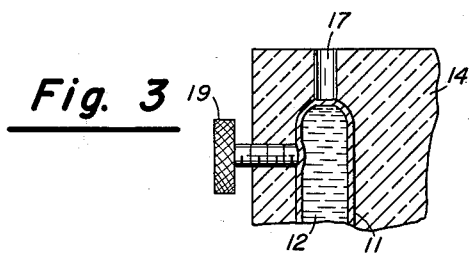
Figure 4:
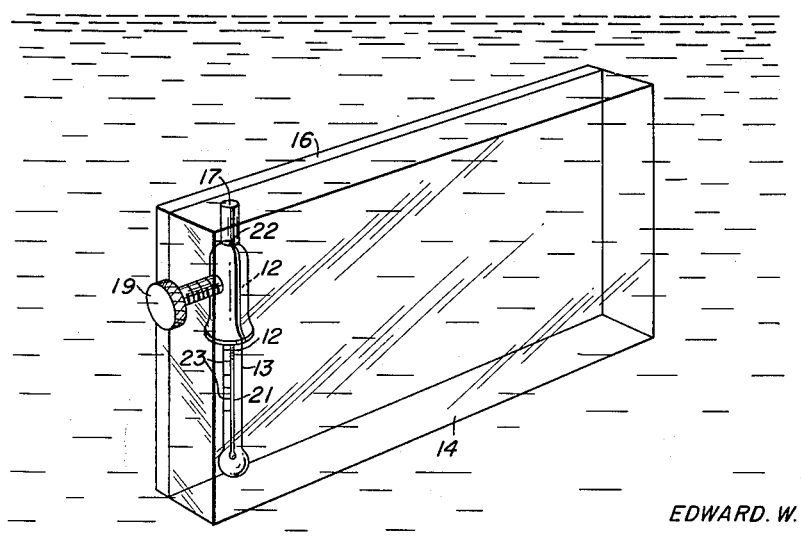

Other objects and many of the attendant advantages of this invention will be readily appreciated as the same becomes better understood by reference to the following detailed description when considered in connection with the accompanying drawings wherein:

FIG. 1 shows a plan view of the depth gauge;
FIG. 2 is a bottom view showing the phosphor plastic backing and the opening whereby the sea water contacts the pressure sensitive diaphragm;
FIG. 3 is an enlarged cross-sectional view showing the adjusting screw pressing against the bulb; and
FIG. 4 is a perspective view of the gauge.

Referring now to the drawings in which like numerals designate like parts in each of the several views, there is shown in FIG. 1 the plan view of the gauge. The gauge is similar in appearance to an eye dropper having a rubber bulb filled with an opaque liquid such as mercury or colored water. The bulb 11, filled with liquid 12, and tube 13 are embedded or incapsulated in a special clear plastic 14 which does not generate heat, expand or contract during polymerization so that clear visibility is uneffected and the tube is not broken. The plastic seals in the tube and bulb but does not bond to the bulb. The clear transparent plastic case 14 is then cast onto a base 16 of phosphor plastic which forms the background for reading the calibrations on the tube and the liquid level therein. After the polymerization is complete a small hole 17 is drilled into the plastic 14 to expose the bulb to the pressure of the water when the gauge is submerged. A second opening 18 is drilled through the plastic to the bulb 11. This opening is threaded and an adjusting screw 19 is inserted. This adjusting screw is for the purpose of exerting sufficient pressure on the bulb to get an initial zero reading at water surface level and to make further adjustments as necessary.

The tube 13 contains both a gas 21 and an indicating liquid 12. As the pressure on the bulb 11 is increased, as when the gauge is submerged, the gas 21 is compressed in the tube 13 due to passage of liquid 12 therein. Ordinarily as the gas is compressed a greater unit of pressure on the bulb 11 is required to move the liquid further into the tube 13. The necessity of making temperature corrections is also overcome by adjusting the volumes and thermal coefficients of expansion thereof. For example, suppose the thermal coefficient of expansion of the gas was 10 times that of the liquid. In this case, the volume of the liquid would be 10 times the volume of the gas. Thus, temperature changes have no effect upon the reading and linear calibrations are possible with maximum accuracy. In the manufacture of the gauge, it is desirable that the cavity or liquid volume of the bulb and the cavity or gas volume of the tube be provided in exact inverse proportion to the ratio of thermal coefficients of expansion of the liquid and gas employed in the gauge. In case of error or difficulty in providing this predetermined ratio, a simple means for adjusting or correcting the error has been provided.

A structural feature going to the heart of the invention and novelty of the device, is the adjustment screw 19 in combination with the resilient bulb 11 containing the liquid 12. This screw, in its neutral position would normally depress the bulb or reservoir 11 slightly. Retracting the adjustment screw from its neutral position would increase the bulb volume, while insertion would decrease that volume whereby the zero reading of the gauge would be established. After this adjustment is made and the zero reading established, no further adjustment should be necessary during the life of the gauge. Basically, said adjustment feature is provided for ultimately neutralizing the effect of temperature variations at various pressure depths.

Theoretically, when the gauge is submerged, the hydraulic pressure or depth to be measured is communicated to the diaphragm 22 through the port 17 in plastic body 14. The liquid 12 in bulb 11 is forced out of said bulb into the tube 13 against the pressure resistance of gas 21. The distance the liquid 12 travels into the tube 13, depends upon volume and pressure of the gas in the tube in accordance with the law of gases expressed by the formula $$\frac{P_1 V_1}{T_1} = \frac{P_2 V_2}{T_2}$$

It is desirable and in fact necessary that the temperature variable be controlled or stabilized in view of extreme temperature changes at normal diving depths, and especially since these temperature variations are not constant over even short range of ocean areas. The main object of this invention as stated is to provide a depth gauge responsive to pressure and volume factors under the law of gases but at the same time be uneffected by water temperature variations.

Mathematically, if the temperature change in the pressure fluid to be measured for depth does not effect the pressure reading then $\Delta T(V_1 C_1)$ must be equated to $\Delta T(V_2 C_2)$ where $\Delta T$ equals the temperature change, $V_1$ equals the volume of the liquid, $V_2$ equals the volume of the gas, $C_1$ equals the thermal coefficient of expansion of the liquid and $C_2$ the thermal coefficient of expansion of the gas. As set forth above $V_1 = x V_2$ when $$C_1 = \frac{C_2}{x}$$

By substitution and cancellation $\Delta T(V_1 C_1) = \Delta T(V_2 C_2)$ becomes $$V_1 C_1 = \left(\frac{V_1}{x}\right)(x C_1) = V_1 C_1$$

and therefore the pressure-volume change on the liquid and the gas due to temperature variations are equal and cancel.

To apply the above principle to the proposed depth gauge, the relative volumes of the bulb 11 containing the liquid 12, and the volume of the tube 13 containing the gas 21, are in the inverse ratio of the respective thermal coefficients of expansion of said liquid and gas. For practical application, the selection of the particular liquid and gas to be used in the gauge, determines in turn, the relative volume of the bulb 11 and tube 13. For example, if the ratio of the thermal coefficients of expansion of the liquid and gas selected for use in the gauge are one to ten, the volume of bulb 11 must be ten times the volume of capillary tube 13.

Another condition to be met is that the liquid 12 and gas 21 must not react chemically with each other. For example, a suitable liquid 12 could be mercury and a suitable gas 21, nitrogen or helium, thus assuring no chemical interaction in the gauge. Therefore the ratio of the bulb 11 volume to the tube 13 volume are inversely proportioned to the relative thermal coefficients of expansion of mercury and nitrogen or helium. If the relative thermal coefficient of expansion of the liquid and gas selected for use in the gauge is 1 to 4 then the liquid bulb volume 11 would be four times the gas tube volume 13.

In operation, during ocean diving, if the gauge had not already been present, it would be placed in the ocean at the surface and the screw 19 adjusted until the liquid 12 in the bulb 11 is at the border between the tube and bulb, namely zero. Under that condition the external pressure is zero and the capillary tube being linearly indexed in terms of pressure depth in feet, a direct reading can be taken from the indices. Thereafter, at various depths, the decrease in water temperature would produce the same relative change in volume of both liquid 12 and gas 21. Consequently any change in the volume of liquid 12 in tube 13 would be entirely due to the hydraulic pressure change on diaphragm 22.

It should be noted from the drawings that clear plastic 14 and the phosphor plastic backing 16 is extended to the right. This is for the purpose of enabling the operator to make appropriate notes of objects, terrain, etc., and recording the depths thereof. This may be done with any underwater marking pencil or pens and the notations can be easily read against the phosphor background. If the phosphor is first exposed to light from an ordinary flashlight for a few minutes, it may be read under water for more than an hour. Of course, exposure to ultraviolet light makes the base active for a much longer period.

Obviously many modifications and variations of the present invention are possible in the light of the above teachings. It is therefore to be understood that within the scope of the appended claims the invention may be practiced otherwise than as specifically described.

I claim:

1. An underwater hydrostatic pressure gauge uneffected by water temperature variations comprising a capillary tube closed at one end and open at the other end thereof, a resilient reservoir completely filled with liquid mercury, said capillary tube being completely filled with helium gas, said open end of said tube inserted in said reservoir, said liquid mercury and said helium gas being in direct contact, the ratio of the tube cavity volume filled with helium gas and the reservoir cavity volume filled with mercury being provided in relative sizes in inverse proportion to the ratio of the thermal coefficients of expansion of said gas and said liquid, said reservoir and tube being encapsulated within a transparent housing, a diaphragm area on said reservoir exposed through an external pressure passage in said housing to the liquid hydrostatic pressure head to be measured, and indicia means associated with said tube for linearly indicating the hydrostatic pressure head.

2. An underwater hydrostatic pressure gauge uneffected by water temperature variations comprising a capillary tube closed at one end and open at the other end thereof, a resilient reservoir completely filled with a liquid mercury of a predetermined thermal coefficient of expansion, said capillary tube having its open end connected to said reservoir and completely filled with helium gas of a predetermined thermal coefficient of expansion, said liquid mercury and said nitrogen gas being in direct contact, the ratio of the volume of said reservoir to the volume of said capillary tube being provided in inverse proportion to the ratio of the thermal coefficients of expansion of said gas to said liquid so that temperature variations effecting the liquid pressure in the reservoir will equally effect the gas pressure in the tube and neutralize the temperature factor, said tube and reservoir being encapsulated within and supported by a transparent housing, a diaphragm area on said reservoir being the only area of said reservoir and tube exposed to the hydrostatic pressure to be measured so that its dilation will force part of the reservoir liquid into the capillary tube, and indicia means on said capillary tube for measuring the column of liquid forced into said tube in terms of hydrostatic pressure.

References Cited in the file of this patent

UNITED STATES PATENTS

| | | |
|---|---|---|
| 360,038 | Myers | Mar. 29, 1887 |
| 1,583,575 | Coberly | May 4, 1926 |
| 1,692,360 | Wolcott et al. | Nov. 20, 1928 |
| 1,720,528 | Saratakoff | July 9, 1929 |
| 2,577,100 | Aluarez | Dec. 4, 1951 |

FOREIGN PATENTS

| | | |
|---|---|---|
| 12,875 | Great Britain | 1849 |